United States Patent
Kato et al.

(10) Patent No.: US 12,291,609 B2
(45) Date of Patent: May 6, 2025

(54) METHOD FOR PRODUCING RESIN PARTICLES AND METHOD FOR PRODUCING TONER

(71) Applicant: FUJIFILM Business Innovation Corp., Tokyo (JP)

(72) Inventors: Yuya Kato, Minamiashigara (JP); Takahiro Yamashita, Minamiashigara (JP); Takahisa Tatekawa, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 124 days.

(21) Appl. No.: 18/304,909

(22) Filed: Apr. 21, 2023

(65) Prior Publication Data

US 2024/0174819 A1 May 30, 2024

(30) Foreign Application Priority Data

Nov. 18, 2022 (JP) .................. 2022-185239

(51) Int. Cl.
| | |
|---|---|
| *C08J 3/12* | (2006.01) |
| *C08K 5/00* | (2006.01) |
| *G03G 9/08* | (2006.01) |
| *G03G 9/087* | (2006.01) |
| *G03G 9/09* | (2006.01) |

(52) U.S. Cl.
CPC .............. *C08J 3/12* (2013.01); *C08K 5/0041* (2013.01); *G03G 9/0804* (2013.01); *G03G 9/0819* (2013.01); *G03G 9/08755* (2013.01); *G03G 9/0906* (2013.01); *C08J 2367/00* (2013.01)

(58) Field of Classification Search
CPC ... G03G 9/0804; G03G 9/0819; G03G 9/0906
See application file for complete search history.

(56) References Cited

U.S. PATENT DOCUMENTS

2008/0311503 A1 12/2008 Nagaoka et al.
2021/0294236 A1 9/2021 Lu

FOREIGN PATENT DOCUMENTS

| EP | 3865942 A1 | 8/2021 | |
|---|---|---|---|
| JP | 3587672 B2 * | 11/2004 | ......... G03G 9/09708 |
| JP | 2009-25794 A | 2/2009 | |
| JP | 2013029587 A * | 2/2013 | |
| JP | 2018-39951 A | 3/2018 | |
| JP | 2019056085 A * | 4/2019 | |

(Continued)

OTHER PUBLICATIONS

Machine translation JP2019056085A (Year: 2019).*

(Continued)

*Primary Examiner* — Jacob T Minskey
*Assistant Examiner* — Wayne K. Swier
(74) *Attorney, Agent, or Firm* — Oliff PLC

(57) ABSTRACT

A method for producing resin particles includes: mixing a binder resin and a dye at temperature T that satisfies formula (1) below to thereby obtain a mixture; and emulsifying the mixture, a basic compound, a water-based solvent, and a surfactant to thereby obtain a resin base particle dispersion:

the melting point $T1$ of the dye≤the temperature $T$≤the thermal decomposition temperature $T2$ of the binder resin.  Formula (1)

21 Claims, 3 Drawing Sheets

(56) References Cited

FOREIGN PATENT DOCUMENTS

JP          2021-147612 A       9/2021

OTHER PUBLICATIONS

Machine translationJP3587672B2 (Year: 2004).*
Machine translation JP2009025794A (Year: 2009).*
Machine translation JP2013029587A (Year: 2013).*
Machine translation JP2019039951A (Year: 2018).*
Oct. 19, 2023 Extended European Search Report Issued in European Patent Application No. 23171692.9.
"A Basic Guide to Particle Characterization", Malvern Instruments Worldwide, White Paper, 2012, p. 1-26, URL:http://golik. co. il/Data/ABasicGuidtoParticleCharacterization(2)_1962085150.pdf.

* cited by examiner

FIG. 3A
FIG. 3B
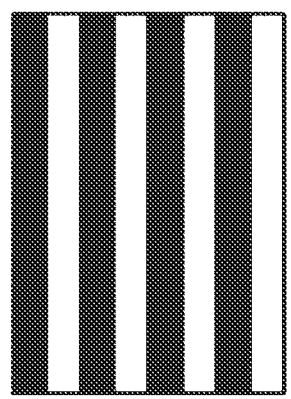
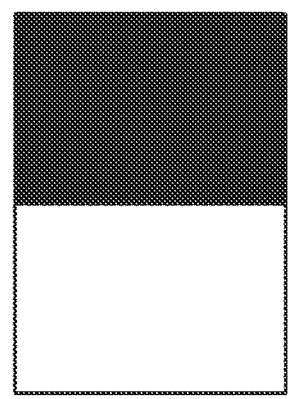

METHOD FOR PRODUCING RESIN PARTICLES AND METHOD FOR PRODUCING TONER

CROSS-REFERENCE TO RELATED APPLICATIONS

This application is based on and claims priority under 35 USC 119 from Japanese Patent Application No. 2022-185239 filed Nov. 18, 2022.

BACKGROUND

(i) Technical Field

The present disclosure relates to a method for producing resin particles and a method for producing a toner.

(ii) Related Art

Japanese Unexamined Patent Application Publication No. 2021-147612 proposes "a fluorescent latex containing water and fluorescent agent-incorporated resin particles, wherein the particles contain a resin and a Förster Resonance Energy Transfer (FRET) pair including a fluorescent brightening agent having a fluorescence emission spectrum and a fluorescent dye having an absorption spectrum that overlaps with the fluorescence emission spectrum of the fluorescent brightening agent, and wherein the fluorescent latex exhibits FRET under illumination with ultraviolet (UV) light.

SUMMARY

Aspects of non-limiting embodiments of the present disclosure relate to a method for producing resin particles including: mixing a binder resin and a dye to obtain a mixture; and emulsifying the mixture, a basic compound, a water-based solvent, and a surfactant to obtain a resin base particle dispersion. In images obtained using the resin particles produced by this method, image unevenness is less than that in images obtained using resin particles produced by a method in which the mixing is performed by mixing the binder resin and the dye at temperature TC that satisfies formula (1C) below (the image unevenness means that, when a stripe pattern image with an area coverage of 50% is repeatedly formed under high-temperature high-humidity conditions and then an image with an area coverage of 50% is formed, the image density in part of the image is smaller or larger than the intrinsic image density of the image).

$$\text{the melting point } T1 \text{ of the dye} > \text{the temperature } TC$$
$$\text{or the temperature } TC > \text{the thermal decomposition temperature } T2 \text{ of the resin} \quad \text{Formula (1C)}$$

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing resin particles, the method including:
mixing a binder resin and a dye at temperature T that satisfies formula (1) below to thereby obtain a mixture; and emulsifying the mixture, a basic compound, a water-based solvent, and a surfactant to thereby obtain a resin base particle dispersion:

$$\text{the melting point } T1 \text{ of the dye} \leq \text{the temperature } T \leq \text{the thermal decomposition temperature } T2 \text{ of the binder resin.} \quad \text{Formula (1)}$$

BRIEF DESCRIPTION OF THE DRAWINGS

An exemplary embodiment of the present disclosure will be described in detail based on the following figures, wherein:

FIGS. 3A and 3B are schematic front views of images produced for the evaluation of image unevenness in Examples.

DETAILED DESCRIPTION

Figure 1:
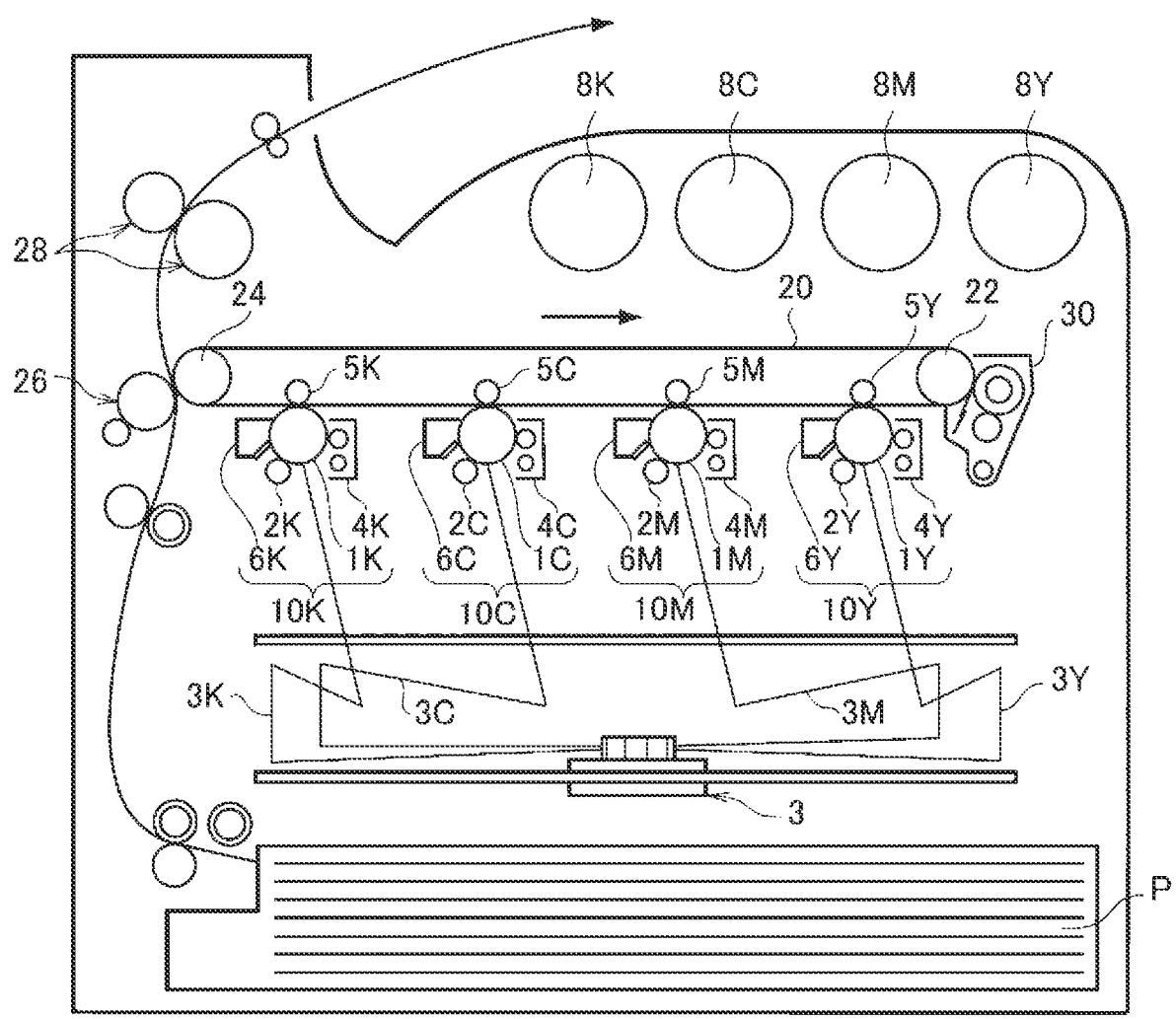
FIG. 1 is a schematic configuration diagram showing an example of an image forming apparatus in the exemplary embodiment.

An exemplary embodiment of the present disclosure will next be described. The description and Examples are illustrative of the exemplary embodiment and are not intended to limit the scope of the disclosure.

In a set of numerical ranges expressed in a stepwise manner in the present specification, the upper or lower limit in one numerical range may be replaced with the upper or lower limit in another numerical range in the set. Moreover, in a numerical range described in the present specification, the upper or lower limit in the numerical range may be replaced with a value indicated in an Example.

Any component may contain a plurality of materials corresponding to the component.

When reference is made to the amount of a component in a composition, if the composition contains a plurality of materials corresponding to the component, the amount means the total amount of the plurality of materials in the composition, unless otherwise specified.

The term "step" is meant to include not only an independent step but also a step that is not clearly distinguished from other steps, so long as the prescribed purpose of the step can be achieved.

<Method for Producing Resin Particles>

A method for producing resin particles according to the present exemplary embodiment includes: mixing a binder resin and a dye at temperature T that satisfies formula (1) below to thereby obtain a mixture (a first step); and emulsifying the mixture, a basic compound, a water-based solvent, and a surfactant to thereby obtain a resin base particle dispersion (a second step):

$$\text{the melting point } T1 \text{ of the dye} \leq \text{the temperature } T \leq \text{the thermal decomposition temperature } T2 \text{ of the binder resin.} \quad \text{Formula (1)}$$

With resin particles produced using the above-described resin particle production method according to the present exemplary embodiment, images with less image unevenness can be obtained. The reason for this may be as follows.

When resin particles containing a dye are produced, the dye in some cases tends to be segregated in the resin particles.

The resin particle production method according to the present exemplary embodiment includes the first step of performing the mixing at the temperature T satisfying formula (1) to thereby obtain the mixture. By performing the first step, the binder resin and the dye are bonded through van der Waals force, and the binder resin and the dye in the mixture tend to be mixed substantially uniformly. The method further includes the second step of emulsifying the mixture, the basic compound, the water-based solvent, and the surfactant to obtain the resin base particle dispersion. By performing the second step after the first step, the substantially uniform mixing state of the binder resin and the dye contained in the resin base particle dispersion is more easily maintained. Therefore, the mixing state of the binder resin and the dye contained in resin particle obtained by the resin particle production method according to the present exemplary embodiment readily tends to be substantially uniform.

It is inferred that, because of the above reason, the resin particle production method according to the present exemplary embodiment can produce resin particles that allow an image with less image unevenness to be obtained.

(First Step)

The first step is the step of mixing the binder resin and the dye at the temperature T satisfying formula (1) below to obtain the mixture.

the melting point $T1$ of the dye≤the temperature $T$≤the thermal decomposition temperature $T2$ of the binder resin.   Formula (1)

No particular limitation is imposed on the method for mixing the binder resin and the dye. Examples of the method include: a method in which the mixing is performed in a stirring device provided with a mixing impeller; and a method in which the mixing is performed in an extruder. The method in which the mixing is performed in an extruder may be used.

By mixing the binder resin and the dye in an extruder, the binder resin and the dye can be easily mixed with a work of from 200 kJ/kg to 500 kJ/kg inclusive. In this case, with the resin particles produced by this production method, an image with less image unevenness can be easily obtained.

The binder resin and the dye are mixed at the temperature T satisfying formula (1) above. From the viewpoint of image unevenness, they are mixed preferably at temperature T satisfying formula (2) below, more preferably at temperature T satisfying formula (3) below, and still more preferably at temperature T satisfying formula (4) below.

the melting point $T1$ of the dye+5° C.≤the temperature $T$≤the thermal decomposition temperature $T2$ of the binder resin−20° C.   Formula (2)

the melting point $T1$ of the dye+10° C.≤the temperature $T$≤the thermal decomposition temperature $T2$ of the binder resin−30° C.   Formula (3)

the melting point $T1$ of the dye+20° C.≤the temperature $T$≤the thermal decomposition temperature $T2$ of the binder resin−40° C.   Formula (4)

The temperature T is a value measured by a thermometer. The thermometer used may be a thermometer provided in a device used for mixing the binder resin and the dye (such as a stirring device or an extruder).

The melting point T1 of the dye is a value measured by a differential scanning calorimeter. The differential scanning calorimeter used may be, for example, DSC3110 (product name), a thermal analysis system 001, manufactured by Mac Science.

The melting point T1 of the dye is measured using the following procedure.

The dye used as a measurement target is subjected to differential scanning calorimetry measurement in the range of from 0° C. to 300° C. inclusive under the condition of a heating rate of 10° C./minute to obtain a DSC (differential scanning calorimetry) curve. The melting point T1 is determined from the DSC curve according to the JIS Standard (JIS K-7121 (2012)).

The thermal decomposition temperature T2 of the binder resin is a value measured by thermogravimetric analysis. The measurement device used for the thermogravimetric analysis may be, for example, TGA-60AH (product name) manufactured by Shimadzu Corporation.

The thermal decomposition temperature T2 of the binder resin is measured using the following procedure.

10 mg of a sample is heated in a nitrogen atmosphere at a heating rate of 10° C./minute, and the temperature at which thermogravimetric change starts is used as the thermal decomposition temperature T2.

In the first step, the binder resin and the dye are mixed with a work of preferably from 200 kJ/kg to 500 kJ/kg inclusive, more preferably from 250 kJ/kg to 450 kJ/kg inclusive, and still more preferably from 300 kJ/kg to 400 kJ/kg inclusive.

The work is computed using the following formula (A).

$(P_e-P_0)/F$   Formula (A)

In formula (A), $P_e$ is the average power (kW) of the device used to mix the binder resin and the dye in the first step (such as a stirring device, or an extruder. The device is referred to as a mixer in this paragraph), and $P_0$ is the idling power of the mixer. F is the average supply amount (kg/h) of the binder resin and the dye to the mixer.

The idling power of the mixer represented by $P_0$ is a work per unit time that is required to operate the mixer in an empty state.

—Binder Resin—

Examples of the binder resin include: vinyl resins composed of homopolymers of monomers such as styrenes (such as styrene, p-chlorostyrene, and α-methylstyrene), (meth) acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl resins composed of copolymers of combinations of two or more of the above monomers.

Other examples of the binder resin include: non-vinyl resins such as epoxy resins, polyester resins, polyurethane resins, polyamide resins, cellulose resins, polyether resins, and modified rosins; mixtures of the non-vinyl resins and the above-described vinyl resins; and graft polymers obtained by polymerizing a vinyl monomer in the presence of any of these resins.

One of these binder resins may be used alone, or two or more of them may be used in combination.

The binder resin may contain a polyester resin.

When the binder resin contains a polyester resin, the binder resin and the dye are more easily bonded together through van der Waals force. In this case, with the resin particles produced by this production method, an image with much less image unevenness can be obtained.

Examples of the polyester resin include well-known amorphous polyester resins. The polyester resin used may be a combination of an amorphous polyester resin and a crystalline polyester resin. The amount of the crystalline polyester resin used may be from 2% by mass to 40% by mass inclusive (preferably from 2% by mass to 20% by mass inclusive) based on the total mass of the binder resin.

The "crystalline" resin means that, in differential scanning calorimetry (DSC), a clear endothermic peak is observed instead of a stepwise change in the amount of heat absorbed. Specifically, the half width of the endothermic peak when the measurement is performed at a heating rate of 10 (° C./min) is 10° C. or less.

The "amorphous" resin means that the half width exceeds 10° C., that a stepwise change in the amount of heat absorbed is observed, or that a clear endothermic peak is not observed.

—Amorphous Polyester Resin

The amorphous polyester resin may be, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (e.g., having 1 to 5 carbon atoms) esters thereof. In particular, the polycarboxylic acid may be, for example, an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (e.g., having 1 to 5 carbon atoms) esters thereof.

Any of these polycarboxylic acids may be used alone or in combination of two or more.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol. Any of these polyhydric alcohols may be used alone or in combination or two or more.

The glass transition temperature (Tg) of the amorphous polyester resin is preferably from 50° C. to 80° C. inclusive and more preferably from 50° C. to 65° C. inclusive.

The glass transition temperature is determined using a DSC curve obtained by differential scanning calorimetry (DSC). More specifically, the glass transition temperature is determined from "extrapolated glass transition onset temperature" described in a glass transition temperature determination method in "Testing methods for transition temperatures of plastics" in JIS K7121:1987.

The weight average molecular weight (Mw) of the amorphous polyester resin is preferably from 5000 to 1000000 inclusive and more preferably from 7000 to 500000 inclusive.

The number average molecular weight (Mn) of the amorphous polyester resin may be from 2000 to 100000 inclusive.

The molecular weight distribution Mw/Mn of the amorphous polyester resin is preferably from 1.5 to 100 inclusive and more preferably from 2 to 60 inclusive.

The weight average molecular weight and the number average molecular weight are measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

The amorphous polyester resin can be obtained by a well-known production method. For example, in one production method, the polymerization temperature is set to from 180° C. to 230° C. inclusive. If necessary, the pressure of the reaction system is reduced, and the reaction is allowed to proceed while water and alcohol generated during condensation are removed.

When raw material monomers are not dissolved or not compatible with each other at the reaction temperature, a high-boiling point solvent serving as a solubilizer may be added to dissolve the monomers. In this case, the polycondensation reaction is performed while the solubilizer is removed by evaporation. When a monomer with poor compatibility is present, the monomer with poor compatibility and an acid or an alcohol to be polycondensed with the monomer are condensed in advance and then the resulting polycondensation product and the rest of the components are subjected to polycondensation.

—Crystalline Polyester Resin

The crystalline polyester resin is, for example, a polycondensation product of a polycarboxylic acid and a polyhydric alcohol. The crystalline polyester resin used may be a commercial product or a synthesized product.

The crystalline polyester resin is preferably a polycondensation product using a polymerizable monomer having a linear aliphatic group rather than using a polymerizable monomer having an aromatic group, in order to facilitate the formation of a crystalline structure.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides thereof, and lower alkyl (e.g., having 1 to 5 carbon atoms) esters thereof.

The polycarboxylic acid used may be a combination of a dicarboxylic acid and a tricarboxylic or higher polycarboxylic acid having a crosslinked or branched structure. Examples of the tricarboxylic acid include aromatic carboxylic acids (such as 1,2,3-benzenetricarboxylic acid, 1,2,4-benzenetricarboxylic acid, and 1,2,4-naphthalene tricarboxylic acid), anhydrides thereof, and lower alkyl (e.g., having 1 to 5 carbon atoms) esters thereof.

The polycarboxylic acid used may be a combination of a dicarboxylic acid, a dicarboxylic acid having a sulfonic acid group, and a dicarboxylic acid having an ethylenic double bond.

Any of these polycarboxylic acids may be used alone or in combination of two or more.

The polyhydric alcohol may be, for example, an aliphatic diol (e.g., a linear aliphatic diol with a main chain having 7 to 20 carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. In particular, the aliphatic diol may be 1,8-octanediol, 1,9-nonanediol, or 1,10-decanediol.

The polyhydric alcohol used may be a combination of a diol and a trihydric or higher polyhydric alcohol having a crosslinked or branched structure. Examples of the trihydric or higher polyhydric alcohol include glycerin, trimethylolethane, trimethylolpropane, and pentaerythritol.

Any of these polyhydric alcohols may be used alone or in combination of two or more.

In the polyhydric alcohol, the content of the aliphatic diol may be 80% by mole or more and preferably 90% by mole or more.

The melting temperature of the crystalline polyester resin is preferably from 50° C. to 100° C. inclusive, more preferably from 55° C. to 90° C. inclusive, and still more preferably from 60° C. to 85° C. inclusive.

The melting temperature is determined using a DSC curve obtained by differential scanning calorimetry (DSC) from "peak melting temperature" described in a melting temperature determination method in "Testing methods for transition temperatures of plastics" in JIS K7121:1987.

The weight average molecular weight (Mw) of the crystalline polyester resin may be from 6000 to 35000 inclusive.

The acid value or the polyester resin is preferably from 1 mgKOH/g to 50 mgKOH/g inclusive, more preferably from 5 mgKOH/g to 40 mgKOH/g inclusive, and still more preferably from 10 mgKOH/g to 30 mgKOH/g inclusive.

The acid value is measured by a potentiometric titration method in JIS K0070-1992.

For example, like the amorphous polyester, the crystalline polyester resin is obtained by a well-known production method.

—Dye—

No particular limitation is imposed on the dye, and oil dyes and water-based dyes can be used.

The oil dye is a dye soluble in solvents other than water and substantially insoluble in water. The oil dye may have a solubility in water (the mass of the dye soluble in 100 g of water) of 1 g or less at 25° C.

The water-based dye is a dye soluble in water. The water-based dye may have a solubility in water of more than 1 g at 25° C.

The dye may be an oil dye.

When the dye used is an oil dye, the compatibility between the binder resin and the dye can be high. Therefore, the mixing state of the binder resin and the dye contained in the resin particles obtained by the resin particle production method according to the present exemplary embodiment can be close to a uniform state. It is therefore inferred that, with the resin particles produced by the above method, an image with less image unevenness can be obtained.

The oil dye may be an oil dye having a carbonyl group.

When the dye used is an oil dye having a carbonyl group, the binder resin and the dye can be more easily bonded together through van der Waals force. Therefore, with the resin particles produced by this production method, an image with much less image unevenness can be obtained.

The oil dye may be at least one selected from the group consisting of perylene-based dyes, naphthalimide-based dyes, xanthene-based dyes, and coumarin-based dyes.

When such a dye is used, the compatibility between the binder resin and the dye can be high. Therefore, the mixing state of the binder resin and the dye contained in the resin particles obtained by the resin particle production method according to the present exemplary embodiment can be close to a uniform state. It is therefore inferred that, with the resin particles produced by the above method, an image with much less image unevenness can be obtained.

The perylene-based dye is a dye having a perylene structure.

The naphthalimide-based dye is a dye having a naphthalimide structure.

The xanthene-based dye is a dye having a xanthene structure.

The coumarin-based dye is a dye having a coumarin structure.

The perylene structure, the naphthalimide structure, the xanthene structure, and the coumarin structure each mean a structure obtained by removing a hydrogen atom from the corresponding compound before the "structure."

Specific examples of the perylene-based dye include Solvent Green 5, Solvent Orange 55, Vat Red 15, Vat Orange 7, F Orange 240, F Red 305, F Red 339, and F Yellow 83.

Specific examples of the naphthalimide-based dye include Solvent Yellow 43, Solvent Yellow 116, and Solvent Yellow 44.

Specific examples of the xanthene-based dye include Solvent yellow 98, Basic Violet 11, and Basic Red 2.

Specific examples of the coumarin-based dye include Disperse Yellow 160, Disperse yellow 82, Disperse yellow 184, Disperse yellow 186, and Disperse yellow 232.

The content of the dye in the mixture is preferably from 0.1% by mass to 20% by mass inclusive, more preferably from 0.5% by mass to 15% by mass inclusive, and still more preferably from 0.1% by mass to 10% by mass inclusive based on the total mass of the mixture.

When the content of the dye in the mixture is from 0.1% by mass to 20% by mass inclusive based on the total mass of the mixture, an image with much less image unevenness can be obtained using the resin particles produced by this production method. The reason for this may be as follows.

When the content of the dye in the mixture is 0.1% by mass or more based on the total mass of the mixture, the binder resin and the dye are more easily bonded together through van der Waals force. In this case, with the resin particles produced by this production method, an image with much less image unevenness can be obtained.

When the content of the dye in the mixture is 20% by mass or less based on the total mass of the mixture, the occurrence of absorption of light reflected between dye particles is reduced.

(Second Step)

The second step is the step of emulsifying the mixture, the basic compound, the water-based solvent, and the surfactant to obtain the resin base particle dispersion.

No particular limitation is imposed on the method for emulsifying the mixture, the basic compound, the water-based solvent, and the surfactant, and a phase inversion emulsification method may be used.

A method using a stirring device provided with a mixing impeller, a method using an extruder, etc. can be used for the emulsification by the phase inversion emulsification method.

Emulsification Method Using Stirring Device Provided with Mixing Impeller

The emulsification method using a stirring device equipped with a mixing impeller may be performed, for example, using the following procedure.

The emulsification procedure may include:
(1-1) the step of dissolving the mixture in a solvent to obtain a solution mixture A;
(1-2) the step of adding the basic compound to the solution mixture A to obtain a solution mixture B; and
(1-3) the step of adding the water-based solvent and the surfactant to the solution mixture B to obtain the resin base particle dispersion.

—(1-1) Step of Dissolving Mixture in Solvent to Obtain Solution Mixture A.

In this step, the mixture is dissolved in the solvent to obtain the solution mixture A.

This step may be performed by adding the mixture and the solvent to the stirring device and stirring the resulting mixture.

No particular limitation is imposed on the solvent, so long as it can dissolve the mixture.

Since phase inversion emulsification is performed, it is preferable that the solvent contains no water.

The solvent used may be, for example, an alcohol-based solvent, a ketone-based solvent, or an ester-based solvent.

—(1-2) Step of Adding Basic Compound to Solution Mixture a to Obtain Solution Mixture B In this step, the basic compound is added to the solution mixture A to obtain the solution mixture B.

This step may be performed by adding the basic compound to the solution mixture A and stirring the resulting mixture.

The basic compound is a compound that exhibits Bronsted basicity.

The Bronsted basicity means that, when the compound is dissolved in water, hydroxide ions (OH⁻s) are generated in the aqueous solution.

Examples of the basic compound include: ammonia; alkali metal hydroxides such as sodium hydroxide and potassium hydroxide; and alkaline-earth hydroxide such as calcium hydroxide and barium hydroxide.

—(1-3) Step of Adding Water-Based Solvent and Surfactant to Solution Mixture B to Obtain Resin Base Particle Dispersion In this step, the water-based solvent and the surfactant are added to the solution mixture B to obtain the resin base particle dispersion.

This step may be performed by adding the water-based solvent and the surfactant to the solution mixture B and stirring the resulting mixture.

The water-based solvent is a solvent containing water.

Examples of the water-based solvent include water and aqueous solutions of salts.

No particular limitation is imposed on the aqueous solutions of salts, and examples thereof include an aqueous sodium hydroxide solution and an aqueous sodium hydrogencarbonate solution.

The water-based solvent used may be water.

Examples of the surfactant include: anionic surfactants such as sulfate-based surfactants, sulfonate-based surfactants, phosphate-based surfactants, and soap-based surfactants; cationic surfactants such as amine salt-based surfactants and quaternary ammonium salt-based surfactants; and nonionic surfactants such as polyethylene glycol-based surfactants, alkylphenol ethylene oxide adduct-based surfactants, and polyhydric alcohol-based surfactants. Of these, an anionic surfactant or a cationic surfactant may be used. A nonionic surfactant may be used in combination with the anionic surfactant or the cationic surfactant.

Any of these surfactants may be used alone or in combination of two or more.

The emulsification method using the stirring device provided with the mixing impeller may be performed using the above-described procedure.

The emulsification method using the stirring device provided with the mixing impeller may optionally include, after (1-3) the step of adding the water-based solvent and the surfactant to the solution mixture B, the step of reducing the content of the solvent contained in the resin base particle dispersion.

In the step of reducing the content of the solvent in the resin base particle dispersion, for example, gas (such as air, nitrogen, or argon) may be bubbled into the resin base particle dispersion.

—Method Using Extruder—

The method using an extruder may be performed, for example, using the following procedure.

The emulsification procedure may include:
(2-1) the step of mixing the mixture and the basic compound using the extruder to obtain a solution mixture A2;
(2-2) the step of adding the surfactant to the solution mixture A2 and stirring the resulting mixture using the extruder to obtain a solution mixture B2; and
(2-3) the step of adding the water-based solvent to the solution mixture B2 and stirring the resulting mixture using the extruder to obtain the resin base particle dispersion.

—(2-1) Step of Mixing Mixture and Basic Compound Using Extruder to Obtain Solution Mixture A2

In this step, the mixture and the basic compound are mixed using the extruder to obtain the solution mixture A2.

The basic compound used may be any of those described in "(1-2) Step of adding basic compound to solution mixture A to obtain solution mixture B" described above.

—(2-2) Step of Adding Surfactant to Solution Mixture A2 and Stirring Resulting Mixture Using Extruder to Obtain Solution Mixture B2

In this step, the surfactant is added to the solution mixture A2, and the resulting mixture is stirred using the extruder to obtain the solution mixture B2.

In this step, the surfactant may be added to the extruder from an inlet port located on the downstream side, with respect to the direction of extrusion, of an inlet port from which the mixture and the basic compound have been added.

The surfactant used may be any of those described in "(1-3) Step of adding water-based solvent and surfactant to solution mixture B to obtain resin base particle dispersion" described above.

One of these surfactants may be used alone, or two or more may be used in combination.

—(2-3) Step of Adding Water-Based Solvent to Solution Mixture B2 and Stirring Resulting Mixture Using Extruder to Obtain Resin Base Particle Dispersion In this step, the water-based solvent is added to the solution mixture B2, and the resulting mixture is stirred using the extruder to obtain the resin base particle dispersion.

In this step, the water-based solvent may be added to the extruder from an inlet port located on the downstream side, with respect to the direction of extrusion, of the inlet port from which the surfactant has been added.

The water-based solvent used may be any of those described in "(1-3) Step of adding water-based solvent and surfactant to solution mixture B to obtain resin base particle dispersion" described above.

(Additional Steps)

The resin particle production method according to the present exemplary embodiment may include additional steps other than the first step and the second step.

Examples of the additional steps include: the step of aggregating binder resin particles contained in a resin particle dispersion and the resin base particles contained in the resin base particle dispersion to form aggregated particles (an aggregated particle forming step); and the step of heating the aggregated particle dispersion containing the aggregated particles dispersed therein to fuse/coalesce the aggregated particles to thereby form resin particles (a fusion/coalescence step).

—Aggregated Particle Forming Step—

The aggregated particle forming step will be described.

The resin particle dispersion and the resin base particle dispersion are mixed, and a coloring agent particle dispersion and a release agent particle dispersion are optionally mixed therewith.

Then the binder resin particles, the resin base particles, the coloring agent particles, and the release agent particles are hetero-aggregated in the dispersion mixture to form aggregated particles containing the binder resin particles, the resin base particles, the coloring agent particles, and the release agent particles and having diameters close to the diameters of the target resin particles.

The binder resin particles are particles containing a binder resin. The binder resin contained in the binder resin particles may be the same binder resin as that contained in the resin base particles.

The binder resin contained in the binder resin particles and the binder resin contained in the resin base particles may be the same or different.

The binder resin contained in the binder resin particles may contain a polyester resin.

Specifically, for example, a flocculant is added to the dispersion mixture, and the pH of the dispersion mixture is adjusted to acidic (for example, a pH of from 2 to 5 inclusive). Then a dispersion stabilizer is optionally added, and the resulting mixture is heated to the glass transition temperature of the binder resin particles and the resin base particles (specifically, for example, a temperature from the glass transition temperature of the binder resin particles and the resin base particles −30° C. to the glass transition temperature −10° C. inclusive) to aggregate the particles dispersed in the dispersion mixture to thereby form aggregated particles.

The aggregated particle forming step may be performed, for example, as follows. The flocculant is added at room temperature (e.g., 25° C.) while the dispersion mixture is stirred in a rotary shearing-type homogenizer. Then the pH of the dispersion mixture is adjusted to acidic (e.g., a pH of from 2 to 5 inclusive), and the dispersion stabilizer is optionally added. Then the resulting mixture is heated.

Examples of the flocculant include a surfactant with a polarity opposite to the polarity of the surfactant used as a dispersant added to the dispersion mixture, inorganic metal salts, and divalent or higher polyvalent metal complexes. In particular, when a metal complex is used as the flocculant, the amount of the surfactant used can be reduced, and charging characteristics are improved.

An additive that forms a complex with a metal ion in the flocculant or a similar bond may be optionally used. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 parts by mass to 5.0 parts by mass inclusive and more preferably 0.1 parts by mass or more and less than 3.0 parts by mass based on 100 parts by mass of the resin particles.

—Fusion/Coalescence Step—

Next, the aggregated particle dispersion in which the aggregated particles are dispersed is heated, for example, to a temperature equal to or higher than the glass transition temperature of the resin particles (e.g., a temperature equal to or higher by 10° C. to 30° C. than the glass transition temperature of the resin particles) to fuse and coalesce the aggregated particles to thereby form resin particles.

The resin particles are obtained through the above-described steps.

Alternatively, the resin particles may be produced through: the step of, after the preparation of the aggregated particle dispersion containing the aggregated particles dispersed therein, mixing the aggregated particle dispersion further with the resin particle dispersion and optionally with the resin base particle dispersion containing the resin base particles dispersed therein and then causing the binder resin particles and optionally the resin base particles to adhere to the surfaces of the aggregated particles to aggregate them to thereby form second aggregated particles; and the step of heating a second aggregated particle dispersion containing the second aggregated particles dispersed therein to fuse and coalesce the second aggregated particles to thereby form resin particles having a core-shell structure.

After completion of the fusion/coalescence step, the resin particles formed in the solution are subjected to a well-known washing step, a solid-liquid separation step, and a drying step to thereby obtain dry resin particles.

From the viewpoint of chargeability, the resin particles may be subjected to displacement washing with ion exchanged water sufficiently in the washing step. No particular limitation is imposed on the solid-liquid separation step. However, from the viewpoint of productivity, suction filtration, pressure filtration, etc. may be performed. No particular limitation is imposed on the drying step. However, from the viewpoint of productivity, freeze-drying, flash drying, fluidized drying, vibrating fluidized drying, etc. may be performed.

The resin particles in the present exemplary embodiment are produced, for example, by adding external additives to the dried resin particles obtained and mixing them. The mixing may be performed, for example, using a V blender, a Henschel mixer, a Loedige mixer, etc. If necessary, coarse particles in the resin particles may be removed using a vibrating sieving machine, an air sieving machine, etc.

The resin particles may be produced through the above steps.

The average particle diameter of the resin particles is preferably from 0.05 μm to 1 μm inclusive, more preferably from 0.10 μm to 0.80 μm inclusive, and still more preferably from 0.15 μm to 0.50 μm inclusive.

The present inventors have conducted extensive studies and found that, when the average particle diameter of the resin particles is from 0.05 μm to 1 μm inclusive, the resin particles can reduce image unevenness, although the reason for this is unclear.

The average particle diameter of the resin particles is measured as follows. A particle size distribution measured by a laser diffraction particle size measurement apparatus (LA-700 manufactured by HORIBA Ltd.) is used and divided into different particle diameter ranges (channels), and a cumulative volume distribution computed from the small particle diameter side is determined. The particle diameter at which the cumulative frequency is 50% with respect to the total particles is measured to compute the average particle diameter.

The resin particles in the present exemplary embodiment can be used as a toner.

Specifically, the resin particle production method according to the present exemplary embodiment may be used as a method for producing a toner.

The toner production method according to the present exemplary embodiment is as follows.

The toner production method includes:
mixing the binder resin and the dye at temperature T that satisfies the above-described formula (1) to thereby obtain the mixture; and
emulsifying the mixture, the basic compound, the water-based solvent, and the surfactant to thereby obtain the resin base particle dispersion;
after the emulsifying, aggregating binder resin particles contained in a resin particle dispersion and the resin base particles contained in the resin base particle dispersion to form aggregated particles; and
heating an aggregated particle dispersion containing the aggregated particles dispersed therein to fuse/coalesce the aggregated particles to thereby form toner particles.

<Toner>

The details of the toner in the present exemplary embodiment will be described.

The toner in the present exemplary embodiment includes the toner particles and optional external additives.

(Toner Particles)

The toner particles include, for example, the binder resin, the dye, an optional coloring agent other than the dye, an optional release agent, and additional additives.

The binder resin and the dye used may each be any of those described above.

The content of the binder resin with respect to the total mass of the toner particles is, for example, preferably from 40% by mass to 95% by mass inclusive, more preferably from 50% by mass to 90% by mass inclusive, and still more preferably from 60% by mass to 85% by mass inclusive.

The content of the dye with respect to the total mass of the toner particles is, for example, preferably from 1% by mass to 30% by mass inclusive and more preferably from 3% by mass to 15% by mass inclusive.

—Coloring Agent Other than Dye—

The coloring agent other than the dye may be a pigment.

Examples of the pigment include various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate.

The coloring agent other than the dye may be optionally subjected to surface treatment or may be used in combination with a dispersant. A plurality of coloring agents other than the dye may be used in combination.

The content of the coloring agent other than the dye with respect to the total amount of the toner particles is preferably from 1% by mass to 50% by mass inclusive and more preferably from 3% by mass to 25% by mass inclusive.

—Release Agent—

Examples of the release agent include: hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent used is not limited to the above release agents.

The melting temperature of the release agent is preferably from 50° C. to 110° C. inclusive and more preferably from 60° C. to 100° C. inclusive.

The melting temperature is determined using a DSC curve obtained by differential scanning calorimetry (DSC) from "peak melting temperature" described in melting temperature determination methods in "Testing methods for transition temperatures of plastics" in JIS K7121-1987.

The content of the release agent with respect to the total mass of the toner particles is, for example, preferably from 1% by mass to 20% by mass inclusive and more preferably from 5% by mass to 15% by mass inclusive.

—Additional Additives—

Examples of the additional additives include well-known additives such as a magnetic material, a charge control agent, and an inorganic powder. These additives are contained in the toner particles as internal additives.

—Characteristics Etc. of Toner Particles—

The toner particles may have a single layer structure or may have a so-called core-shell structure including a core (core particle) and a coating layer (shell layer) covering the core.

Toner particles having the core-shell structure may each include, for example: a core containing a binder resin and optional additives such as a coloring agent and a release agent; and a coating layer containing a binder resin.

The volume average particle diameter (D50v) of the toner particles is preferably from 2 μm to 10 μm inclusive and more preferably from 4 μm to 8 μm inclusive.

Average particle diameters and particle size distribution indexes of the toner particles are measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% aqueous solution of a surfactant (which may be sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using an aperture having an aperture diameter of 100 μm in the Coulter Multisizer II. The number of particles sampled is 50000.

The particle size distribution measured and divided into particle size ranges (channels) is used to obtain volume-based and number-based cumulative distributions computed from the small diameter side. In the computed volume-based cumulative distribution, the particle diameter at a cumulative frequency of 16% is defined as a volume-based particle diameter D16v, and the particle diameter at a cumulative frequency of 50% is defined as a volume average particle diameter D50v. The particle diameter at a cumulative frequency of 84% is defined as a volume-based particle diameter D84v. In the number-based cumulative distribution, the particle diameter at a cumulative frequency of 16% is defined as a number-based particle diameter D16p, and the particle diameter at a cumulative frequency of 50% is defined as a number average cumulative particle diameter D50p. Moreover, the particle diameter at a cumulative frequency of 84% is defined as a number-based particle diameter D84p.

These are used to compute a volume-based particle size distribution index (GSDv) defined as $(D84v/D16v)^{1/2}$ and a number-based particle size distribution index (GSDp) defined as $(D84p/D16p)^{1/2}$.

The average circularity of the toner particles is preferably from 0.94 to 1.00 inclusive and more preferably from 0.95 to 0.98 inclusive.

The circularity of a toner particle is determined as (the peripheral length of an equivalent circle of the toner particle)/(the peripheral length of the toner particle) [i.e., (the peripheral length of a circle having the same area as a projection image of the particle)/(the peripheral length of the projection image of the particle)]. Specifically, the average circularity is a value measured by the following method.

First, the toner particles used for the measurement are collected by suction, and a flattened flow of the particles is formed. Particle images are captured as still images using flashes of light, and the average circularity is determined by subjecting the particle images to image analysis using a flow-type particle image analyzer (FPIA-3000 manufactured by SYSMEX Corporation). The number of particles sampled for determination of the average circularity is 3500.

When the toner contains external additives, the toner (developer) for the measurement is dispersed in water containing a surfactant, and the dispersion is subjected to ultrasonic treatment. The toner particles with the external additives removed are thereby obtained.

(External Additives)

Examples of the external additives include inorganic particles. Examples of the inorganic particle include particles of inorganic materials such as $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, $MgSO_4$, $SrTiO_3$, $BaTiO_3$, and $CaTiO_3$.

The surfaces of the inorganic particles used as an external additive may be subjected to hydrophobization treatment. The hydrophobization treatment is performed, for example, by immersing the inorganic particles in a hydrophobizing agent. No particular limitation is imposed on the hydrophobizing agent, and examples of the hydrophobizing agent include silane-based coupling agents, silicone oils, titanate-based coupling agents, and aluminum-based coupling agents. One of these may be used alone, or two or more of them may be used in combination.

The amount of the hydrophobizing agent is generally, for example, from 1 part by mass to 10 parts by mass inclusive based on 100 parts by mass of the inorganic particles.

Other examples of the external additives include resin particles (particles of resins such as polystyrene, polymethyl methacrylate (PMMA), and melamine resins) and cleaning activators (such as metal salts of higher fatty acids typified by zinc stearate and fluorine-based polymer particles).

The amount of the external additives added externally with respect to the amount of the toner particles is, for example, preferably from 0.01% by mass to 10% by mass inclusive and more preferably from 2% by mass to 6% by mass inclusive.

<Electrostatic Image Developer>

The toner in the present exemplary embodiment can be used for an electrostatic image developer.

The electrostatic image developer in the present exemplary embodiment contains at least the toner in the present exemplary embodiment.

The electrostatic image developer in the present exemplary embodiment may be a one-component developer containing only the toner in the present exemplary embodiment or a two-component developer containing a mixture of the toner and a carrier.

No particular limitation is imposed on the carrier, and any well-known carrier may be used. Examples of the carrier include: a coated carrier prepared by coating the surface of a core material formed of a magnetic powder with a coating resin; a magnetic powder-dispersed carrier prepared by dispersing a magnetic powder in a matrix resin; and a resin-impregnated carrier prepared by impregnating a porous magnetic powder with a resin.

In each of the magnetic powder-dispersed carrier and the resin-impregnated carrier, the particles included in the carrier may be used as cores, and the cores may be coated with a coating resin.

Examples of the magnetic powder include: powders of magnetic metals such as iron, nickel, and cobalt; and powders of magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicone resins having organosiloxane bonds and modified products thereof, fluorocarbon resins, polyesters, polycarbonates, phenolic resins, and epoxy resins.

The coating resin and the matrix resin may contain additional additives such as electrically conductive particles.

Examples of the electrically conductive particles include: particles of metals such as gold, silver, and copper; and particles of carbon black, titanium oxide, zinc oxide, tin oxide, barium sulfate, aluminum borate, and potassium titanate.

To coat the surface of the core material with the coating resin, for example, a method that uses a coating layer-forming solution prepared by dissolving the coating resin and various optional additives in an appropriate solvent may be used. No particular limitation is imposed on the solvent. The solvent may be selected in consideration of the type of coating resin used, ease of coating, etc.

Specific examples of the resin coating method include: an immersion method in which the core material is immersed in the coating layer-forming solution; a spray method in which the coating layer-forming solution is sprayed onto the surface of the core material; a fluidized bed method in which the coating layer-forming solution is sprayed onto the core material floated by the flow of air; and a kneader-coater method in which the core material of the carrier and the coating layer-forming solution are mixed in a kneader coater and then the solvent is removed.

The mixing ratio (mass ratio) of the toner and the carrier in the two-component developer is preferably toner:carrier=1:100 to 30:100 and more preferably 3:100 to 20:100.

<Image Forming Apparatus/Image Forming Method>

The electrostatic image developer in the present exemplary embodiment is applicable to the following image forming apparatus and the following image forming method.

The image forming apparatus/the image forming method in the present exemplary embodiment will be described.

The image forming apparatus in the present exemplary embodiment includes: an image holding member; a charging device that charges the surface of the image holding member; an electrostatic image forming device that forms an electrostatic image on the charged surface of the image holding member; a developing device that houses an electrostatic image developer and develops the electrostatic image formed on the surface of the image holding member with the electrostatic image developer to thereby form a toner image; a transferring device that transfers the toner image formed on the surface of the image holding member onto a surface of a recording medium; and a fixing device that fixes the toner image transferred onto the surface of the recording medium. The electrostatic image developer used is the electrostatic image developer in the present exemplary embodiment.

In the image forming apparatus in the present exemplary embodiment, an image forming method (an image forming method in the present exemplary embodiment) is performed. The image forming method includes: charging the surface of the image holding member; forming an electrostatic image on the charged surface of the image holding member; developing the electrostatic image formed on the surface of the image holding member with the electrostatic image developer in the present exemplary embodiment to thereby form a toner image; transferring the toner image formed on the surface of the image holding member onto a surface of a recording medium; and fixing the toner image transferred onto the surface of the recording medium.

The image forming apparatus in the present exemplary embodiment may be applied to well-known image forming apparatuses such as: a direct transfer-type apparatus that transfers a toner image formed on the surface of the image holding member directly onto a recording medium; an intermediate transfer-type apparatus that first-transfers a toner image formed on the surface of the image holding member onto the surface of an intermediate transfer body and second-transfers the toner image transferred onto the surface of the intermediate transfer body onto the surface of a recording medium; an apparatus including a cleaning device that cleans the surface of the image holding member after the transfer of the toner image but before charging; and an apparatus including a charge eliminating device that eliminates charges on the surface of the image holding member after the transfer of the toner image but before charging by irradiating the surface of the image holding member with charge eliminating light.

In the intermediate transfer-type apparatus, the transferring device includes, for example: an intermediate transfer body having a surface onto which a toner image is to be transferred; a first transferring device that first-transfers a toner image formed on the surface of the image holding member onto the surface of the intermediate transfer body; and a second transferring device that second-transfers the toner image transferred onto the surface of the intermediate transfer body onto the surface of a recording medium.

In the image forming apparatus in the present exemplary embodiment, for example, a portion including the developing device may have a cartridge structure (process cartridge) that is detachably attached to the image forming apparatus. The process cartridge used may be, for example, a process cartridge including the developing device that houses the electrostatic image developer in the present exemplary embodiment.

An example of the image forming apparatus in the present exemplary embodiment will be described, but this example is not a limitation. Note that major components shown in FIG. 1 will be described, and description of other components will be omitted.

FIG. 1 is a schematic configuration diagram showing the image forming apparatus in the present exemplary embodiment.

The image forming apparatus shown in FIG. 1 includes first to fourth electrophotographic image forming units 10Y, 10M, 10C, and 10K (image forming devices) that output yellow (Y), magenta (M), cyan (C), and black (K) images, respectively, based on color-separated image data. These image forming units (hereinafter may be referred to simply as "units") 10Y, 10M, 10C, and 10K are arranged so as to be spaced apart from each other horizontally by a prescribed distance. These units 10Y, 10M, 10C, and 10K may each be a process cartridge detachably attached to the image forming apparatus.

An intermediate transfer belt 20 used as an intermediate transfer body is disposed above the units 10Y, 10M, 10C, and 10K in FIG. 1 so as to extend through these units. The intermediate transfer belt 20 is wound around a driving roller 22 and a support roller 24 in contact with the inner surface of the intermediate transfer belt 20 and runs in a direction from the first unit 10Y toward the fourth unit 10K. The driving roller 22 and the support roller 24 are disposed so as to be separated from each other in the left-right direction in FIG. 1. A force is applied to the support roller 24 by, for example, an unillustrated spring in a direction away from the driving roller 22, so that a tension is applied to the intermediate transfer belt 20 wound around the rollers. An intermediate transfer body cleaner 30 is disposed on an image holding member-side of the intermediate transfer belt 20 so as to be opposed to the driving roller 22.

Four color toners including yellow, magenta, cyan, and black toners contained in toner cartridges 8Y, 8M, 8C, and 8K, respectively, are supplied to developing units (developing devices) 4Y, 4M, 4C, and 4K, respectively, of the units 10Y, 10M, 10C, and 10K.

The first to fourth units 10Y, 10M, 10C, and 10K have the same structure. Therefore, the first unit 10Y that is disposed upstream in the running direction of the intermediate transfer belt and forms a yellow image will be described as a representative unit. The same portions of the second to fourth units 10M, 10C, and 10K as those in the first unit 10Y are designated by the same reference symbols with the letter yellow (Y) replaced with magenta (M), cyan (C), and black (K), and their description will be omitted.

The first unit 10Y includes a photoconductor 1Y serving as an image holding member. A charging roller (an example of the charging device) 2Y, an exposure unit (an example of the electrostatic image forming device) 3, a developing unit (an example of the developing device) 4Y, a first transfer roller 5Y (an example of the first transferring device), and a photoconductor cleaner (an example of the cleaning device) 6Y are disposed around the photoconductor 1Y in this order. The charging roller charges the surface of the photoconductor 1Y to a prescribed potential, and the exposure unit 3 exposes the charged surface to a laser beam 3Y according to a color-separated image signal to thereby form an electrostatic image. The developing unit 4Y supplies a charged toner to the electrostatic image to develop the electrostatic image, and the first transfer roller 5Y transfers the developed toner image onto the intermediate transfer belt 20. The photoconductor cleaner 6Y removes the toner remaining on the surface of the photoconductor 1Y after the first transfer.

The first transfer roller 5Y is disposed on the inner side of the intermediate transfer belt 20 and placed at a position opposed to the photoconductor 1Y. Bias power sources (not shown) for applying a first transfer bias are connected to the respective first transfer rollers 5Y, 5M, 5C, and 5K. The bias power sources are controlled by an unillustrated controller to change the values of transfer biases applied to the respective first transfer rollers.

A yellow image formation operation in the first unit 10Y will be described.

First, before the operation, the surface of the photoconductor 1Y is charged by the charging roller 2Y to a potential of −600 V to −800 V.

The photoconductor 1Y is formed by stacking a photosensitive layer on a conductive substrate (with a volume resistivity of, for example, $1×10^{-6}$ Ω·cm or less at 20° C.). The photosensitive layer generally has a high resistance (the resistance of a general resin) but has the property that, when irradiated with a laser beam 3Y, the specific resistance of a portion irradiated with the laser beam is changed. Therefore, the laser beam 3Y is outputted from the exposure unit 3 toward the charged surface of the photoconductor 1Y according to yellow image data sent from an unillustrated controller. The laser beam 3Y is projected onto the photosensitive layer on the surface of the photoconductor 1Y, and an electrostatic image with a yellow image pattern is thereby formed on the surface of the photoconductor 1Y.

The electrostatic image is an image formed on the surface of the photoconductor 1Y by charging and is a negative latent image formed as follows. The specific resistance of the irradiated portions of the photosensitive layer irradiated with the laser beam 3Y decreases, and this causes charges on the surface of the photoconductor 1Y to flow. However, the charges in portions not irradiated with the laser beam 3Y remain present, and the electrostatic image is thereby formed.

The electrostatic image formed on the photoconductor 1Y rotates to a prescribed developing position as the photoconductor 1Y rotates. Then the electrostatic image on the photoconductor 1Y at the developing position is visualized (developed) as a toner image by the developing unit 4Y.

An electrostatic image developer containing, for example, at least a yellow toner and a carrier is contained in the developing unit 4Y. The yellow toner is agitated in the developing unit 4Y and thereby frictionally charged. The charged yellow toner has a charge with the same polarity (negative polarity) as the charge on the photoconductor 1Y and is held on a developer roller (an example of a developer holding member). As the surface of the photoconductor 1Y passes through the developing unit 4Y, the yellow toner electrostatically adheres to charge-eliminated latent image portions on the surface of the photoconductor 1Y, and the latent image is thereby developed with the yellow toner. Then the photoconductor 1Y with the yellow toner image formed thereon continues running at a prescribed speed, and the toner image developed on the photoconductor 1Y is transported to a prescribed first transfer position.

When the yellow toner image on the photoconductor 1Y is transported to the first transfer position, a first transfer bias is applied to the first transfer roller 5Y, and an electrostatic force directed from the photoconductor 1Y toward the first transfer roller 5Y acts on the toner image, so that the toner image on the photoconductor 1Y is transferred onto the intermediate transfer belt 20. The transfer bias applied in this case has a (+) polarity opposite to the (−) polarity of the toner and is controlled to +10 μA, for example, in the first unit 10Y by the controller (not shown).

The toner remaining on the photoconductor 1Y is removed and collected by the photoconductor cleaner 6Y.

The first transfer biases applied to the first transfer rollers 5M, 5C, and 5K of the second unit 10M and subsequent units are controlled in the same manner as in the first unit.

The intermediate transfer belt 20 with the yellow toner image transferred thereon in the first unit 10Y is sequentially transported through the second to fourth units 10M, 10C and 10K, and toner images of respective colors are superimposed and multi-transferred.

Then the intermediate transfer belt 20 with the four color toner images multi-transferred thereon in the first to fourth units reaches a second transfer portion that is composed of the intermediate transfer belt 20, the support roller 24 in contact with the inner surface of the intermediate transfer belt, and a second transfer roller (an example of the second transferring device) 26 disposed on the image holding surface side of the intermediate transfer belt 20. A recording paper sheet (an example of the recording medium) P is supplied to a gap between the second transfer roller 26 and the intermediate transfer belt 20 in contact with each other at a prescribed timing through a supply mechanism, and a second transfer bias is applied to the support roller 24. The transfer bias applied in this case has the same polarity (−) as the polarity (−) of the toner, and an electrostatic force directed from the intermediate transfer belt 20 toward the recording paper sheet P acts on the toner image, so that the toner image on the intermediate transfer belt 20 is transferred onto the recording paper sheet P. In this case, the second transfer bias is determined according to a resistance detected by a resistance detection device (not shown) that detects the resistance of the second transfer portion and is voltage-controlled.

Then the recording paper sheet P is transported to a press contact portion (nip portion) of a pair of fixing rollers in a fixing unit (an example of the fixing device) 28, and the toner image is fixed onto the recording paper sheet P to thereby form a fixed image.

Examples of the recording paper sheet P onto which a toner image is to be transferred include plain paper sheets used for electrophotographic copying machines, printers, etc. Examples of the recording medium include, in addition to the recording paper sheets P, transparencies.

To further improve the smoothness of the surface of a fixed image, it may be necessary that the surface of the recording paper sheet P be smooth. For example, coated paper prepared by coating the surface of plain paper with, for example, a resin, art paper for printing, etc. are suitably used.

The recording paper sheet P with the color image fixed thereon is transported to an ejection portion, and a series of the color image formation operations is thereby completed.

<Process Cartridge/Toner Cartridge>

The process cartridge in the present exemplary embodiment includes a developing device that houses the electrostatic image developer in the present exemplary embodiment and develops an electrostatic image formed on the surface of an image holding member with the electrostatic image developer to thereby form a toner image. The process cartridge is detachably attached to the image forming apparatus.

The structure of the process cartridge in the present exemplary embodiment is not limited to the above-described structure and may include the developing device and at least one optional device selected from other devices such as an image holding member, a charging device, an electrostatic image forming device, and a transferring device.

An example of the process cartridge in the present exemplary embodiment will be described, but the example is not a limitation. Note that major components shown in FIG. 2 will be described, and description of other components will be omitted.

Figure 2:
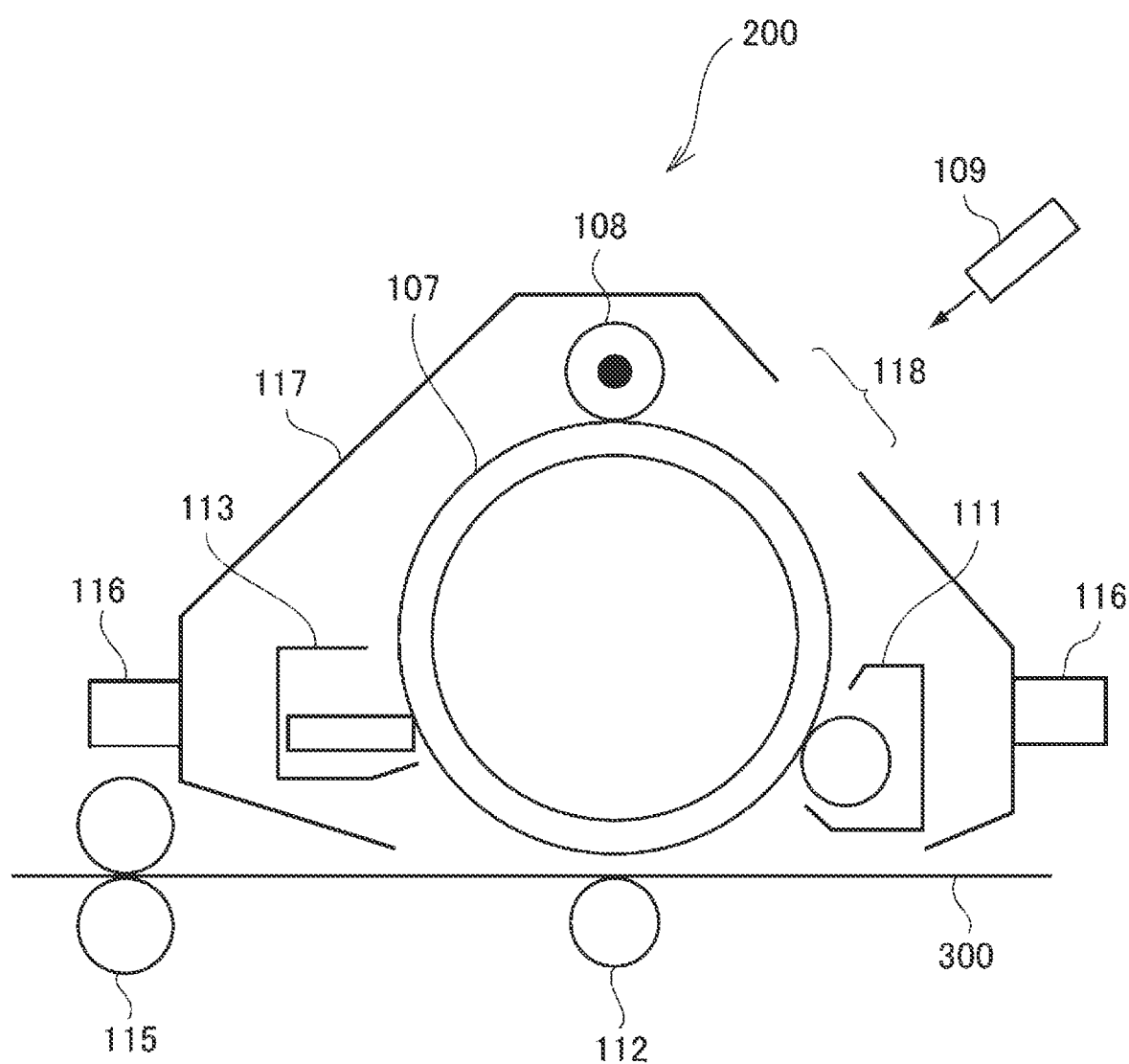
FIG. 2 is a schematic configuration diagram showing an example of a process cartridge detachably attached to the image forming apparatus in the exemplary embodiment.

FIG. 2 is a schematic configuration diagram showing the process cartridge in the present exemplary embodiment.

The process cartridge 200 shown in FIG. 2 includes, for example, a housing 117 including mounting rails 116 and an opening 118 for light exposure and further includes a photoconductor 107 (an example of the image holding member), a charging roller 108 (an example of the charging device) disposed on the circumferential surface of the photoconductor 107, a developing unit 111 (an example of the developing device), and a photoconductor cleaner 113 (an example of the cleaning device), which are integrally combined and held in the housing 117 to thereby form a cartridge.

In FIG. 2, 109 denotes an exposure unit (an example of the electrostatic image forming device), and 112 denotes a transferring unit (an example of the transferring device). 115 denotes a fixing unit (an example of the fixing device), and 300 denotes a recording paper sheet (an example of the recording medium).

Next, a toner cartridge in the present exemplary embodiment will be described.

The toner cartridge in the present exemplary embodiment contains a toner in the present exemplary embodiment and is detachably attached to an image forming apparatus. The toner cartridge contains a replenishment toner to be supplied to a developing device disposed in the image forming apparatus.

The image forming apparatus shown in FIG. 1 has a structure in which the toner cartridges 8Y, 8M, 8C, and 8K are detachably attached, and the developing units 4Y, 4M, 4C, and 4K are connected to the respective toner cartridges (with respective colors) through unillustrated toner supply tubes. When the amount of the toner contained in a toner cartridge is reduced, this toner cartridge is replaced.

EXAMPLES

Examples will next be described. However, the present disclosure is not limited to these Examples. In the following description, "parts" and "%" are based on mass, unless otherwise specified.

<Production of Binder Resins>
(Production of Polyester Resin 1)

Terephthalic acid: 30 parts by mole
Fumaric acid: 70 parts by mole
Ethylene oxide adduct of bisphenol A: 5 parts by mole
Propylene oxide adduct of bisphenol A: 95 parts by mole The above materials are placed in a flask equipped with a stirrer, a nitrogen introduction tube, a temperature sensor, and a rectifying column. The temperature of the mixture is increased to 220° C. over 1 hour, and 1 part of titanium tetraethoxide is added to 100 parts of the above materials. While water produced is removed by evaporation, the temperature is increased to 230° C. over 30 minutes. A dehydration condensation reaction is continued at 230° C. for 1 hour, and the reaction product is cooled. A polyester resin 1, i.e., a binder resin, having an acid value of 12.0 mgKOH/g, a glass transition temperature of 60° C., and a thermal decomposition temperature T of 300° C. is thereby obtained.

(Production of Polyester Resin 2)
A polyester resin 2 is produced using the same procedure as for the polyester resin 1 except that 25 parts by mole of terephthalic acid is used.

(Production of Polyester Resin 3)
A polyester resin 3 is produced using the same procedure as for the polyester resin 1 except that 27 parts by mole of terephthalic acid is used.

(Production of Polyester Resin 4)
A polyester resin 4 is produced using the same procedure as for the polyester resin 1 except that 37.5 parts by mole of terephthalic acid is used.

(Production of Polyester Resin 5)
A polyester resin 5 is produced using the same procedure as for the polyester resin 1 except that 42 parts by mole of terephthalic acid is used.

<Production of Binder Resin Particle Dispersion>
A container equipped with a temperature controller and a nitrogen purging device is charged with 40 parts of ethyl acetate and 25 parts of 2-butanol to prepare a solvent mixture, and 100 parts of the polyester resin 1 is gradually added to the solvent mixture and dissolved therein. Then a 10% by mass aqueous ammonia solution is added thereto (in a molar amount corresponding to three times the acid value of the resin), and the mixture is stirred for 30 minutes. Next, the container is purged with dry nitrogen. While the temperature is held at 40° C., 400 parts of ion exchanged water is added dropwise to the solution mixture under stirring at a rate of 2 parts/minute. After completion of the dropwise addition, the temperature of the mixture is returned to room temperature (20° C. to 25° C.), and dry nitrogen is bubbled for 48 hours under stirring to reduce the concentrations of ethyl acetate and 2-butanol to 1,000 ppm or less. A resin particle dispersion is thereby obtained. Ion exchanged water is added to the resin particle dispersion to adjust the solid content to 20% by mass, and a binder resin particle dispersion is thereby obtained.

<Preparation of Release Agent Particle Dispersion>
Paraffin wax (HNP-9 manufactured by Nippon Seiro Co., Ltd.): 100 parts
Anionic surfactant (NEOGEN RK manufactured by DAI-ICHI KOGYO SEIYAKU Co., Ltd.): 1 part
Ion exchanged water: 350 parts The above materials are mixed, heated to 100° C., dispersed using a homogenizer (product name: ULTRA-TURRAX T50, IKA), and subjected to dispersion treatment using a Manton-Gaulin high-pressure homogenizer (Gaulin Corporation) to thereby obtain a release agent particle dispersion (solid content: 20% by mass) in which the release agent particles having a volume average particle diameter of 200 nm are dispersed.

Example 1

(First Step)
200 Parts by mass of the polyester resin 1 and 2 parts of a dye (Solvent Green 5 manufactured by BASF Colors & Effects Japan Ltd., melting point T1: 200° C.) are placed in a twin screw extruder (product name: TEM26SS manufactured by TOSHIBA MACHINE CO., LTD.) from its raw material inlet port and melted at a barrel temperature (the temperature T) of 220° C. and a screw rotation speed of 400 rpm (revolutions per minute) to thereby produce a mixture.
(Second Step)

A container equipped with a temperature controller and a nitrogen purging device is charged with 40 parts of ethyl acetate and 25 parts of 2-butanol to prepare a solvent mixture, and the above mixture is gradually added to the solvent mixture and dissolved therein. Then a 10% by mass aqueous ammonia solution is added thereto (in a molar amount corresponding to three times the acid value of the resin), and the resulting mixture is stirred for 30 minutes. Next, the container is purged with dry nitrogen. While the temperature is held at 40° C., 400 parts of ion exchanged water is added dropwise to the solution mixture under stirring at a rate of 2 parts/minute. After completion of the dropwise addition, the temperature of the mixture is returned to room temperature (20° C. to 25° C.), and dry nitrogen is bubbled for 48 hours under stirring to reduce the concentrations of ethyl acetate and 2-butanol to 1,000 ppm or less. Next, 1.0 part of a 48.5% by mass aqueous solution of sodium dodecyl phenyl ether disulfonate (ELEMINOL MON-7 manufactured by Sanyo Chemical Industries, Ltd.) used as a surfactant is added, and ion exchanged water is further added to adjust the solid content to 20% by mass to thereby obtain a resin base particle dispersion (P1). The volume average particle diameter of the resin base particles is 0.2 μm.
(Other Steps)
—Production of Toner Particles—
  Resin base particle dispersion (P1): 3.7 parts
  Binder resin particle dispersion: 80 parts
  Release agent particle dispersion: 8.0 parts
  Anionic surfactant (NEOGEN RK DAI-ICHI KOGYO SEIYAKU Co., Ltd. 20%): 1.1 parts The above materials are placed in a stainless steel round flask. Then 0.1N(=mol/L) nitric acid is added to adjust the pH to 3.5, and 30 parts of an aqueous nitric acid solution with a poly-aluminum chloride concentration of 10% by mass is added. Then a homogenizer (product name: ULTRA-TURRAX T50 manufactured by IKA) is used to disperse the particles at a solution temperature of 30° C., and the mixture is heated to 45° C. in a heating oil bath and held for 30 minutes. Then 20 parts of the resin particle dispersion (1) is added, and the resulting mixture is held for 1 hour. A 0.1 mol/L aqueous sodium hydroxide solution is added to adjust the pH to 8.5, and the mixture is heated to 84° C. and held for 2.5 hours. Next, the mixture is cooled to 20° C. at a rate of 20° C./minute, and the solids are separated by filtration, washed sufficiently with ion exchanged water, and dried to thereby obtain toner particles. The volume average particle diameter of the toner particles is 6 μm.
—Production of Toner—

100 Parts of the toner particles obtained, 1.5 parts of hydrophobic silica (RY50 manufactured by Nippon Aerosil Co., Ltd.), and 1.0 part of hydrophobic titanium oxide (T805 manufactured by Nippon Aerosil Co., Ltd.) are mixed and blended using a sample mill for 30 seconds at 10,000 rpm (revolutions per minute). Then the mixture is sieved using a vibrating sieve with a mesh size of 45 μm to prepare a toner. The volume average particle diameter of the toner is 6.0 μm.
—Production of Electrostatic Image Developer—
  Ferrite particles (average particle diameter: 35 μm): 100 parts
  Toluene: 14 parts
  Polymethyl methacrylate (MMA, weight average molecular weight: 75,000): 5 parts
  Carbon black: 0.2 parts (VXC-72 manufactured by Cabot Corporation, volume resistivity: 100 Ω·cm or less)

The above materials except for the ferrite particles are dispersed using a sand mill to prepare a dispersion, and the dispersion and the ferrite particles are placed in a vacuum degassed-type kneader and dried with stirring under reduced pressure to thereby obtain a carrier.

8 Parts of the toner and 92 parts of the carrier are mixed in a V blender to produce a developer (electrostatic image developer).

Example 2

(First Step)

200 Parts by mass of the polyester resin 1 and 2 parts of a dye (Solvent Green 5 manufactured by BASF Colors & Effects Japan Ltd., a perylene-based dye) are placed in a twin screw extruder (product name: TEM26SS manufactured by TOSHIBA MACHINE CO., LTD.) from its raw material inlet port and melted at a barrel temperature (the temperature T) of 220° C. and a screw rotation speed of 400 rpm (revolutions per minute) to thereby produce a mixture.
(Second Step)

200 Parts of the mixture and 0.2 parts of a 50% by mass aqueous sodium hydroxide solution are added to the twin screw extruder from its raw material inlet port. 4.1 Parts of a 48.5% by mass aqueous solution of sodium dodecyl phenyl ether disulfonate (ELEMINOL MON-7 manufactured by Sanyo Chemical Industries, Ltd.) used as a surfactant is added from the fourth barrel of the twin screw extruder, and 150 parts of ion exchanged water adjusted to 90° C. is added from the fifth barrel. 150 Parts of ion exchanged water adjusted to 90° C. is added from the seventh barrel, and 150 parts of ion exchanged water adjusted to 90° C. is added from the ninth barrel. The resulting mixture is emulsified at a barrel temperature of 90° C. and a screw rotation speed of 400 rpm to obtain a resin base particle dispersion (P2). The volume average particle diameter of the resin base particles is 0.2 μm. The solid content is 31%.
(Other Steps)

Toner particles, a toner, and a developer are obtained using the same procedure as in Example 1.

Examples 3 to 16 and Comparative Examples 1 and 2

Resin base particle dispersions, toner particles, toners, and developers are obtained using the same procedure as in Example 1 except that the barrel temperature, i.e., the temperature T, in the first step, the work in the first step, the content of the dye in the mixture, and the average particle diameter of the toner particles are changed as shown in Tables 1 and 2. The work in the first step is adjusted by changing the rotation speed of the screw.

Examples 17 to 20

Resin base particle dispersions, toner particles, toners, and developers are obtained using the same procedure as in Example 1 except that the polyester resin 1 is changed to one of the following polyester resins. In these Examples, the polyester resin 1 contained in the binder resin particle dispersion is also changed to one of the following polyester resins.

Example 17: Polyester Resin 2

Example 18: Polyester Resin 3

Example 19: Polyester Resin 4

Example 20: Polyester Resin 5

Examples 21 to 26

Resin base particle dispersions, toner particles, toners, and developers are obtained using the same procedure as in Example 1 except that the dye is changed to one of the following dyes.

Example 21: Basic Yellow 40 (Winchemical Industrial Co., Ltd, Water-Based Dye)

Example 22: Disperse Yellow 9 (FUJIFILM Wako Pure Chemical Corporation, Oil Dye Containing No Carbonyl Group)

Example 23: Solvent Yellow 43 (K. Sakai & Co., Ltd., Naphthalimide-Based Dye)

Example 24: Solvent Yellow 98 (ARIMOTO CHEMICAL Co., Ltd., Xanthene-Based Dyes)

Example 25: Disperse Yellow 160 (ARIMOTO CHEMICAL Co., Ltd., Coumarin-Based Dye)

Example 26: Solvent Yellow 104 (Kiwa Chemical Industry Co., Ltd., Azo-Based Dye)

<Evaluation>
(Evaluation of Transfer Efficiency)

To evaluate transfer efficiency, an apparatus for transfer efficiency evaluation is prepared. Specifically, an image forming apparatus (DocuCentre Color 400 manufactured by Fuji Xerox Co., Ltd.) is modified such that, after a toner has been transferred from a photoconductor onto an intermediate transfer body, the photoconductor is stopped before cleaned. A developer is filled into a developing unit of the image forming apparatus, and a toner is filled into a toner cartridge of the developing unit. This transfer efficiency evaluation apparatus is used to evaluate the transfer efficiency of an image using the following method.

A developing potential is adjusted such that the mass per unit area of the toner on the photoconductor is 5 g/cm 2 in an environment of a temperature of 28° C. and a humidity of 85% RH. Next, after the toner developed on the photoconductor has been transferred onto the intermediate transfer body (intermediate transfer belt), the transfer efficiency evaluation apparatus is stopped. In this case, the toner not transferred onto the intermediate transfer body remains on the photoconductor before cleaning. A piece of tape (1 cm×5 cm) is applied to the photoconductor to collect the toner remaining on the photoconductor, and the weight of the toner is measured. The amount of the toner transferred onto the intermediate transfer body is computed from the difference between the mass per unit area of the toner developed on the photoconductor (preset value: 5 g/m$^2$) and the measured mass per unit area of the toner on the photoconductor after the transfer, and the transfer efficiency is determined using the following formula.

Transfer efficiency=amount of toner transferred onto intermediate transfer body/mass per unit area developed on photoconductor×100

The transfer efficiency is measured immediately after an image with an image area of 5% with respect to the total sheet area has been continuously outputted onto 50,000 A4 sheets. An allowable range is B and higher.
—Evaluation Criteria—
  A: The transfer efficiency is 98% or more.
  B: The transfer efficiency is 95% or more and less than 98%.
  C: The transfer efficiency is 90% or more and less than 95%.
  D: The transfer efficiency is less than 90%.
(Evaluation of Image Unevenness)

First, the environment in an image forming apparatus is adjusted to a high-temperature high-humidity environment (30° C. 90%), and the image forming apparatus is left to stand for 3 days. After the image forming apparatus has been left to stand, an image with a pattern A (shown in FIG. 3A) with an area coverage of 50% is outputted on 20000 A3 sheets. After the image has been outputted, an image with a pattern B (shown in FIG. 3B) with an area coverage of 50% is outputted on one A3 sheet. The density of a 100% solid image portion in the pattern B image outputted on the one sheet is checked. The density is checked by measuring the density using an image density meter X-Rite 938 (manufactured by X-Rite) and converting the density to a numerical value. The density is measured at 10 randomly selected points on the solid image portion, and the difference in image density, i.e., the difference between the maximum measured density and the minimum measured density, is used as the image unevenness result. The evaluation criteria are as follows, and an allowable range is B and higher.
—Evaluation Criteria—
  A: The difference in image density is 0.2 or less.
  B: The difference in image density is more than 0.2 and 0.3 or less.
  C: The difference in image density is more than 0.3 and 0.35 or less.
  D: The difference in image density is more than 0.35 and 0.4 or less.

TABLE 1

| | | Barrel temperature [° C.] | Melting point T1 of dye [° C.] | Thermal decomposition temperature T2 of binder resin | Work in first step [kJ/kg] | Dye | Content of dye [%] | Average diameter of resin particles [μm] | Acid value of polyester resin [mgKOH/g] | Transfer efficiency | Image unevenness |
|---|---|---|---|---|---|---|---|---|---|---|---|
| Example | 1 | 220 | 200 | 300 | 300 | Solvent Green 5 | 1 | 0.2 | 15 | A | A |
| | 2 | 220 | 200 | 300 | 300 | Solvent Green 5 | 1 | 0.2 | 15 | A | A |
| | 3 | 200 | 200 | 300 | 300 | Solvent Green 5 | 1 | 0.2 | 15 | A | B |

TABLE 1-continued

| | Barrel temperature [° C.] | Melting point T1 of dye [° C.] | Thermal decomposition temperature T2 of binder resin | Work in first step [kJ/kg] | Dye | Content of dye [%] | Average diameter of resin particles [μm] | Acid value of polyester resin [mgKOH/g] | Transfer efficiency | Image unevenness |
|---|---|---|---|---|---|---|---|---|---|---|
| 4 | 300 | 200 | 300 | 300 | Solvent Green 5 | 1 | 0.2 | 15 | B | A |
| 5 | 220 | 200 | 300 | 100 | Solvent Green 5 | 1 | 0.2 | 15 | A | B |
| 6 | 220 | 200 | 300 | 200 | Solvent Green 5 | 1 | 0.2 | 15 | A | B |
| 7 | 220 | 200 | 300 | 500 | Solvent Green 5 | 1 | 0.2 | 15 | B | A |
| 8 | 220 | 200 | 300 | 800 | Solvent Green 5 | 1 | 0.2 | 15 | B | A |
| 9 | 220 | 200 | 300 | 300 | Solvent Green 5 | 0.05 | 0.2 | 15 | A | B |
| 10 | 220 | 200 | 300 | 300 | Solvent Green 5 | 0.1 | 0.2 | 15 | A | A |
| 11 | 220 | 200 | 300 | 300 | Solvent Green 5 | 20 | 0.2 | 15 | A | B |
| 12 | 220 | 200 | 300 | 300 | Solvent Green 5 | 25 | 0.2 | 15 | A | B |
| 13 | 220 | 200 | 300 | 300 | Solvent Green 5 | 1 | 0.02 | 15 | A | B |
| 14 | 220 | 200 | 300 | 300 | Solvent Green 5 | 1 | 0.05 | 15 | A | A |

TABLE 2

| | | Barrel temperature [° C.] | Melting point T1 of dye [° C.] | Thermal decomposition temperature T2 of binder resin | Work in first step [kJ/kg] | Dye | Content of dye [%] | Average diameter of resin particles [μm] | Acid value of polyester resin [mgKOH/g] | Transfer efficiency | Image unevenness |
|---|---|---|---|---|---|---|---|---|---|---|---|
| Example | 15 | 220 | 200 | 300 | 300 | Solvent Green 5 | 1 | 1 | 15 | A | A |
| | 16 | 220 | 200 | 300 | 300 | Solvent Green 5 | 1 | 2 | 15 | A | B |
| | 17 | 220 | 200 | 300 | 300 | Solvent Green 5 | 1 | 0.2 | 0.5 | B | A |
| | 18 | 220 | 200 | 300 | 300 | Solvent Green 5 | 1 | 0.2 | 1 | A | A |
| | 19 | 220 | 200 | 300 | 300 | Solvent Green 5 | 1 | 0.2 | 50 | A | A |
| | 20 | 220 | 200 | 300 | 300 | Solvent Green 5 | 1 | 0.2 | 70 | B | A |
| Comparative Example | 1 | 180 | 200 | 300 | 300 | Solvent Green 5 | 1 | 0.2 | 15 | C | D |
| | 2 | 320 | 200 | 300 | 300 | Solvent Green 5 | 1 | 0.2 | 15 | D | C |
| Example | 21 | 220 | 200 | 300 | 300 | Basic Yellow 40 | 1 | 0.2 | 15 | B | A |
| | 22 | 220 | 190 | 300 | 300 | Disperse Yellow 9 | 1 | 0.2 | 15 | A | B |
| | 23 | 220 | 130 | 300 | 300 | Solvent Yellow 43 | 1 | 0.2 | 15 | A | A |
| | 24 | 220 | 110 | 300 | 300 | Solvent Yellow 98 | 1 | 0.2 | 15 | A | A |
| | 25 | 220 | 270 | 300 | 300 | Disperse Yellow 160 | 1 | 0.2 | 15 | A | A |
| | 26 | 220 | 200 | 300 | 300 | Solvent Yellow 104 | 1 | 0.2 | 15 | A | B |

As can be seen from the above results, with the resin particle production method in the Examples, images with less image unevenness can be obtained.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A method for producing resin particles, the method including: mixing a binder resin and a dye at temperature T that satisfies formula (1) below to thereby obtain a mixture; and emulsifying the mixture, a basic compound, a water-based solvent, and a surfactant to thereby obtain a resin base particle dispersion:

the melting point $T1$ of the dye≤the temperature $T$≤the thermal decomposition temperature $T2$ of the binder resin. Formula (1)

(((2))) The method for producing resin particles according to (((1))), wherein, in the mixing, the binder resin and the dye are mixed with a work of from 200 kJ/kg to 500 kJ/kg inclusive.

(((3))) The method for producing resin particles according to (((1))), wherein the mixing is performed using an extruder.

(((4))) The method for producing resin particles according to (((1))), wherein the dye is an oil dye.

(((5))) The method for producing resin particles according to (((4))), wherein the oil dye is an oil dye having a carbonyl group.

(((6))) The method for producing resin particles according to (((5))), wherein the oil dye having a carbonyl group is at least one selected from the group consisting of perylene-based dyes, naphthalimide-based dyes, xanthene-based dyes, and coumarin-based dyes.

(((7))) The method for producing resin particles according to (((1))), wherein the content of the dye in the mixture is from 0.1% by mass to 20% by mass inclusive based on the total mass of the mixture.

(((8))) The method for producing resin particles according to (((1))), wherein resin particles having an average particle diameter of from 0.05 μm to 1 μm inclusive are obtained.

(((9))) The method for producing resin particles according to (((1))), the binder resin contains a polyester resin.

(((10))) The method for producing resin particles according to (((9))), wherein the polyester resin has an acid value of from 1 mgKOH/g to 50 mgKOH/g inclusive.

(((11))) A method for producing a toner, the method including: after the emulsifying in the method for producing resin particles according to any one of (((1))) to (((10))), aggregating binder resin particles contained in a resin particle dispersion and resin base particles contained in the resin base particle dispersion to thereby form aggregated particles; and heating an aggregated particle dispersion containing the aggregated particles dispersed therein to fuse/coalesce the aggregated particles to thereby form toner particles.

What is claimed is:

1. A method for producing resin particles, the method comprising:
   a first step of mixing a binder resin and a dye at temperature T that satisfies formula (1) below to thereby obtain a mixture; and
   a second step of emulsifying the mixture, a basic compound, a water-based solvent, and a surfactant to thereby obtain a resin base particle dispersion,
   wherein the first step is performed before the second step:

the melting point $T1$ of the dye≤the temperature $T$≤the thermal decomposition temperature $T2$ of the binder resin. Formula (1)

2. The method for producing resin particles according to claim 1, wherein, in the mixing, the binder resin and the dye are mixed with a work of from 200 KJ/kg to 500 KJ/kg inclusive, where work is determined by Formula (A), $(P_e-P_0)/F$ Formula (A)

$P_e$ is the average power in kW of a mixer used to mix the binder resin and the dye;
   $P_0$ is the idling power of the mixer in kW; and
   F is the average supply amount in kg/h of the binder resin and the dye to the mixer.

3. The method for producing resin particles according to claim 1, wherein the mixing is performed using an extruder.

4. The method for producing resin particles according to claim 1, wherein the dye is an oil dye.

5. The method for producing resin particles according to claim 4, wherein the oil dye is an oil dye having a carbonyl group.

6. The method for producing resin particles according to claim 5, wherein the oil dye having a carbonyl group is at least one selected from the group consisting of perylene-based dyes, naphthalimide-based dyes, xanthene-based dyes, and coumarin-based dyes.

7. The method for producing resin particles according to claim 1, wherein the content of the dye in the mixture is from 0.1% by mass to 20% by mass inclusive based on the total mass of the mixture.

8. The method for producing resin particles according to claim 1, wherein resin particles having an average particle diameter of from 0.05 μm to 1 μm inclusive are obtained, wherein the average particle diameter is determined at a cumulative frequency of 50% with respect to the total particles measured to compute the average particle diameter.

9. The method for producing resin particles according to claim 1, wherein the binder resin contains a polyester resin.

10. The method for producing resin particles according to claim 9, wherein the polyester resin has an acid value of from 1 mgKOH/g to 50 mgKOH/g inclusive.

11. A method for producing a toner, the method comprising:
    after the emulsifying in the method for producing resin particles according to claim 1, aggregating binder resin particles contained in a resin particle dispersion and resin base particles contained in the resin base particle dispersion to thereby form aggregated particles; and
    heating an aggregated particle dispersion containing the aggregated particles dispersed therein to fuse/coalesce the aggregated particles to thereby form toner particles.

12. A method for producing a toner, the method comprising:
- after the emulsifying in the method for producing resin particles according to claim 2, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

13. A method for producing a toner, the method comprising:
- after the emulsifying in the method for producing resin particles according to claim 3, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

14. A method for producing a toner, the method comprising:
- after the emulsifying in the method for producing resin particles according to claim 4, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

15. A method for producing a toner, the method comprising:
- after the emulsifying in the method for producing resin particles according to claim 5, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

16. A method for producing a toner, the method comprising:
- after the emulsifying in the method for producing resin particles according to claim 6, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

17. A method for producing a toner, the method comprising:
- after the emulsifying in the method for producing resin particles according to claim 7, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

18. A method for producing a toner, the method comprising:
- after the emulsifying in the method for producing resin particles according to claim 8, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

19. A method for producing a toner, the method comprising:
- after the emulsifying in the method for producing resin particles according to claim 9, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

20. A method for producing a toner, the method comprising:
- after the emulsifying in the method for producing resin particles according to claim 10, aggregating binder resin particles contained in a resin particle dispersion and resin base particles contained in the resin base particle dispersion to thereby form aggregated particles; and
- heating an aggregated particle dispersion containing the aggregated particles dispersed therein to fuse/coalesce the aggregated particles to thereby form toner particles.

21. The method for producing resin particles according to claim 1, wherein the basic compound is a compound that exhibits Bronsted basicity.

* * * * *